UNITED STATES PATENT OFFICE.

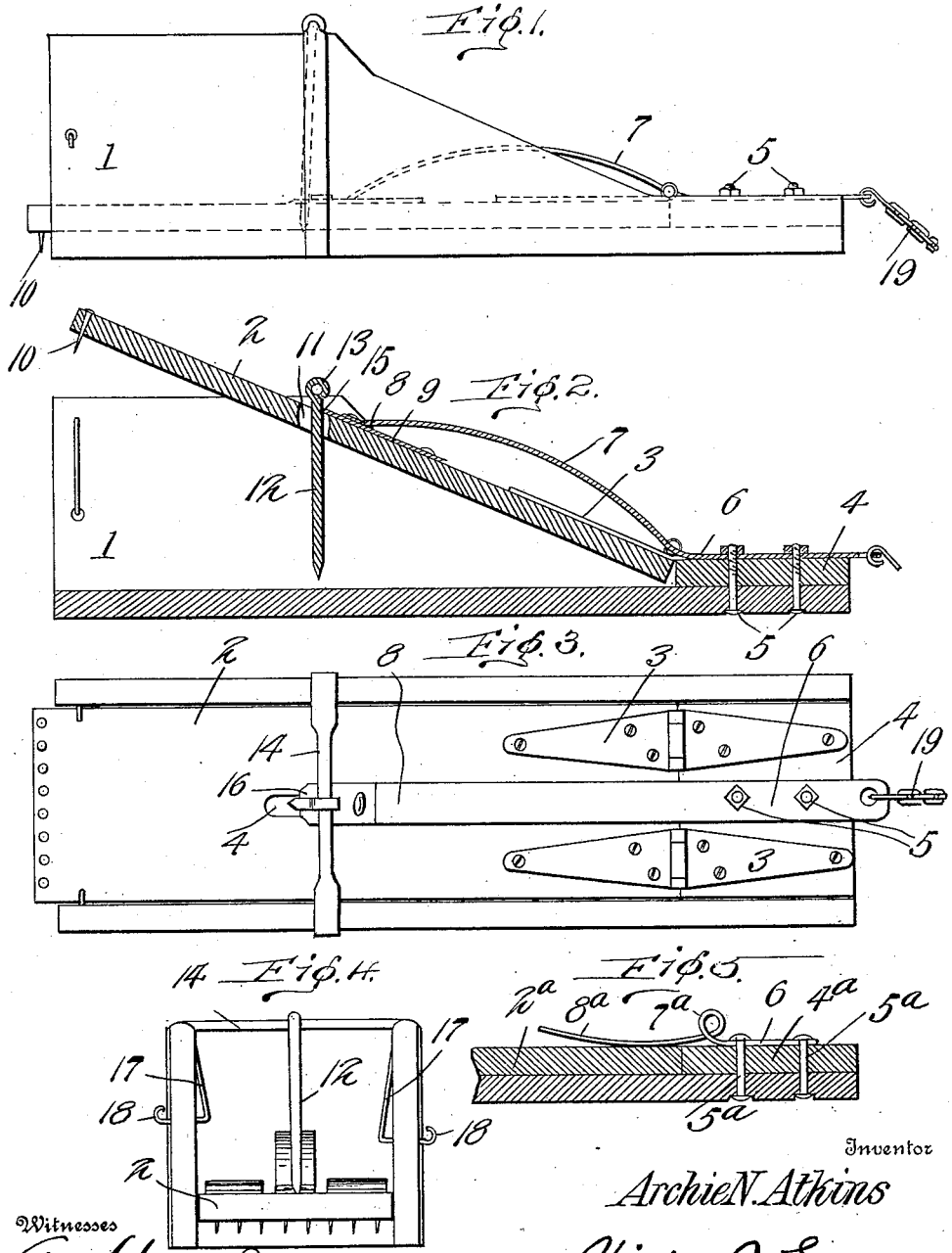

ARCHIE N. ATKINS, OF IDA, LOUISIANA.

ANIMAL-TRAP.

No. 914,912.  Specification of Letters Patent.  Patented March 9, 1909.

Application filed September 15, 1908. Serial No. 453,167.

*To all whom it may concern:*

Be it known that I, ARCHIE N. ATKINS, a citizen of the United States of America, residing at Ida, in the parish of Caddo and State of Louisiana, have invented new and useful Improvements in Animal-Traps, of which the following is a specification.

This invention relates to animal and bird traps, and one of the principal objects of the same is to provide a trap of simple construction and of few parts which will effectually secure animals or birds and prevent their escape after the trap has been sprung.

Another object of the invention is to provide a spring trap in which the spring jaw is held open by a notched bait pin engaged by a rigid catch, said bait pin being released by a slight movement to permit the jaw to close.

These and other objects may be attained by means of the construction illustrated in the accompanying drawing, in which,—

Figure 1 is a side elevation of a trap made in accordance with my invention. Fig. 2 is a longitudinal vertical section of the same. Fig. 3 is a top plan view of the same, the trap being shown sprung. Fig. 4 is a front end view of the same. Fig. 5 is a detail sectional view illustrating a modified form of jaw spring.

Referring to the drawing, the numeral 1 designates the frame of the trap comprising a bottom and two sides, said frame being open at the top and at the front end and the sides being cut away toward the rear. The spring jaw 2 is connected by means of hinges 3 to the base block 4. Bolts 5 extend through the bottom of the frame, through said base block and through the spring 6. This spring is provided with a curved portion 7, and the free end 8 of the spring bears against a wear plate 9 secured to the top of the jaw member 2. On the front of the jaw member 2 a series of pins 10 is secured, said pins projecting below the jaw and disposed beyond the front end of the frame. Formed in the jaw member 2 is a slot or opening 11, and extending through said opening is the bait pin 12, said bait pin being pivoted by means of a loop 13 upon a cross bar 14 supported upon the upper edges of the sides of the frame. The bait pin 12 is provided with a suitable notch 15 which is engaged by the front end 16 of the wear plate 9. For holding the jaw member 2 down after the trap has been sprung, spring locks 17 connected to the sides of the frame extend inward and prevent the jaw member 2 from being raised. Hooked members 18 on said locks permit them to be drawn outwardly to allow the jaw member to be raised and set. A chain 19 is connected to the extended end of the spring 6 for staking the trap in place.

As shown in Fig. 5, the jaw member $2^a$ of the trap is hinged to the block $4^a$, and the spring $6^a$ is formed of wire provided with a loop $7^a$ and an upwardly curved end $8^a$ which bears upon the upper surface of the jaw member $2^a$. Any suitable number of these wire springs may be used, and they may be held in position by means of the bolts $5^a$.

The operation of my trap may be briefly described as follows:—Suitable bait having been placed upon the pin 12 and the jaw member 2 raised until the front end of the plate 9 engages the notch 15 in said pin to set the trap, an animal or bird will move the pin 12 in endeavoring to get the bait, and the slight movement of the pin will disengage the plate from the notch and permit the jaw 2 to drop, forced downward by the spring 6.

From the foregoing it will be obvious that my invention is of simple construction, cannot readily get out of order, is reliable in operation and can be produced at slight cost.

I claim:—

The herein described trap comprising a frame having an open top and front end, a jaw member hinged to said frame, a spring connected to said frame and bearing upon said jaw member, a bait pin extending through said jaw member and provided with a notch, a cross bar to which said bait pin is pivoted, said cross bar being secured to the frame, and a wear plate secured to said jaw member for engaging said notch, said bait pin serving as a trigger.

In testimony whereof I affix my signature in presence of two witnesses.

ARCHIE N. ATKINS.

Witnesses:
J. D. MARTIN,
HOMER ATKINS.